US007926507B2

(12) United States Patent
Wetsch et al.

(10) Patent No.: US 7,926,507 B2
(45) Date of Patent: Apr. 19, 2011

(54) INFLATION NOZZLE WITH VALVE-LOCATING PROBE AND PULSATING AIR SUPPLY

(75) Inventors: Thomas Wetsch, St. Charles, IL (US); Thomas McNellis, Tinley Park, IL (US)

(73) Assignee: Pregis Innovative Packaging, Inc., Deerfield, IL (US)

( * ) Notice: Subject to any disclaimer, the term of this patent is extended or adjusted under 35 U.S.C. 154(b) by 990 days.

(21) Appl. No.: 11/497,667

(22) Filed: Aug. 1, 2006

(65) Prior Publication Data

US 2008/0029162 A1 Feb. 7, 2008

(51) Int. Cl.
*F16K 15/20* (2006.01)

(52) U.S. Cl. ........................ 137/223; 239/504; 239/518

(58) Field of Classification Search .................. 137/223; 141/10, 68, 114, 315; 239/518, 519, 461, 239/504, 524

See application file for complete search history.

(56) References Cited

U.S. PATENT DOCUMENTS

| | | | | |
|---|---|---|---|---|
| 1,247,326 | A * | 11/1917 | Porter | 137/223 |
| 1,508,984 | A * | 9/1924 | Myers | 137/223 |
| 2,103,822 | A * | 12/1937 | Perry | 137/223 |
| 3,087,518 | A * | 4/1963 | Scholle | 141/315 |
| 4,405,158 | A * | 9/1983 | Huberman | 137/223 |
| 5,103,879 | A * | 4/1992 | Hickerson | 141/67 |
| 5,261,466 | A | 11/1993 | Koyanagi | 141/10 |
| 6,209,286 | B1 * | 4/2001 | Perkins et al. | 53/403 |
| 7,225,599 | B2 * | 6/2007 | Sperry et al. | 53/403 |
| 2003/0108699 | A1 * | 6/2003 | Tanaka | 428/35.2 |
| 2004/0163991 | A1 | 8/2004 | Koyanagi et al. | 206/521 |
| 2005/0109656 | A1 | 5/2005 | Ishizaki | 206/522 |
| 2006/0042184 | A1 | 3/2006 | Perkins et al. | 53/79 |
| 2006/0218880 | A1 | 10/2006 | Sperry et al. | 53/403 |

FOREIGN PATENT DOCUMENTS

| | | |
|---|---|---|
| DE | 38 13 309 | 3/1989 |
| EP | 1 616 693 A2 | 1/2006 |
| JP | 06074397 A * | 3/1994 |
| WO | WO 94/06686 | 3/1994 |
| WO | WO 95/01923 | 1/1995 |
| WO | WO 00/53501 | 9/2000 |

OTHER PUBLICATIONS

International Search Report for PCT/US2007/074952.

* cited by examiner

*Primary Examiner* — John Rivell
*Assistant Examiner* — Craig Price
(74) *Attorney, Agent, or Firm* — Dorsey & Whitney LLP

(57) ABSTRACT

An inflation nozzle for inflating an inflatable structure. The inflation nozzle includes a nozzle body, a probe, and a connection portion. The nozzle body defines a nozzle channel therethrough, and the channel has a channel outlet for expelling a fluid therefrom. The probe extends from the nozzle body adjacent and beyond the channel outlet, and is configured and dimensioned to facilitate positioning an inflation aperture of the flexible structure onto the nozzle body for directing fluid into the inflation aperture. The connection portion associates with the nozzle body for fluidly connecting the channel to a fluid source for delivering fluid through the channel to inflate the flexible structure.

29 Claims, 10 Drawing Sheets

INFLATION NOZZLE WITH VALVE-LOCATING PROBE AND PULSATING AIR SUPPLY

FIELD OF THE INVENTION

The present invention relates to an inflation device, and more particularly to a device for improving the inflation of flexible structures.

BACKGROUND OF THE PRESENT INVENTION

Devices are known for use in inflating flexible structures, such as an inflatable air cushion or bag that is used to provide added protection to an object during packaging. One type of air cushion is typically made by sealing plastic sheets to form a series of flexible, plastic, tubular portions that can be connected and adjoined in parallel to or in series with each other. A filler conduit can direct air to the tubular portions via one-way check-valves to inflate the tubular portions and maintain them in an inflated state. Once inflated, the air cushion is typically configured to surround the object that is to be protected, such as by forming a pocket in which the object is placed and then folding over a portion of the inflated air cushion to secure the object therein. An example of such an air cushion is the AIRSPEED™ 9000 AIR-PAQ™ by Pregis Corporation. Descriptions of other examples of inflatable air cushions can be found in, for example, U.S. Pat. No. 5,261,466, and U.S. Application Publication Nos. 2003/0108699, 2004/0163991, and 2005/0109656.

Pumps used in the devices can be operated manually or automatically with a compressor and regulator, and are typically used to pump a fluid, such as air, into a structure. In the uninflated state, the plastic tubular portions are typically flat to facilitate shipping before use as packing material. Due in part to the inherent stickiness or tackiness, and flexibility, of the plastic material, it is often difficult to locate and open the aperture, such as at the open end of the filler conduit, through which air is to be pumped into the air cushion. Additionally, the inflation pressure of traditional inflation devices must be carefully regulated and gauged so as to not overinflate the cushion, or blow the aperture of the air cushion from association with the nozzle of the inflation device, yet also to open the check-valves, which are often stuck in the closed state. Typical air cushions must also be manipulated by the user to help promote even inflation of each of its tubular portions.

Thus, there is a need for an inflation device that can facilitate inflation of inflatable, flexible structures, such as inflatable air cushions by facilitating location of the inflation opening in the cushion and insertion of the inflation nozzle therein.

SUMMARY OF THE INVENTION

The present invention is directed to an inflation device for inflating an inflatable, flexible structure. In the preferred embodiment, the inflation device includes an inflation nozzle, which includes a nozzle body, a probe, and a connection portion. The nozzle body defines a nozzle channel therethrough, and the channel has a channel outlet for expelling a fluid therefrom. The probe extends from the nozzle body adjacent and beyond the channel outlet, and is configured and dimensioned to facilitate positioning an inflation aperture of the flexible structure, such as at the end of a filler conduit thereof, onto the nozzle body for directing fluid into the inflation aperture. The connection portion is associated with the nozzle body for fluidly connecting the channel to a fluid source for delivering fluid through the channel to inflate the flexible structure. Preferably, the flexible structure is an air cushion.

The probe can include a tongue that is substantially flat on at least one side parallel to a flow of the expelled fluid. More preferably, the tongue can be substantially flat on opposite sides parallel to the flow of the expelled fluid. The probe is preferably mounted within the nozzle channel, and it protrudes therefrom. In one embodiment, the probe extends beyond the channel outlet by between about 0.05 and 0.25 inches. Preferably, the ratio between the length beyond which the probe protrudes from the channel outlet and the diameter of the channel outlet is between about 1 and 1.5, and more preferably about 1.25.

The channel outlet is preferably configured to direct the expelled fluid along a longitudinal axis that is parallel to the channel. The nozzle body preferably has an exterior engagement surface configured for reception within and contact with the aperture of the flexible structure for directing fluid therein. In one embodiment, the diameter of the engagement surface at its widest point is between about ¼ and ⅓ inches. The nozzle body can also include ribs that protrude radially therefrom. The ribs are preferably configured for improving sealing of the flexible structure about the nozzle body to retain the fluid within the flexible structure.

The inflation nozzle can also be mounted to a bracket configured for attachment to a table to fix the nozzle in a predetermined position with respect to the table. This facilitates the insertion of the nozzle in the filler conduit of the flexible structure by moving the flexible structure across the table towards the mounted nozzle. The inflation device also can include a ramp mountable to the surface of the table with a height to position the flexible structure with respect to the mounted nozzle body to facilitate associating the flexible structure and nozzle body for inflation.

The inflation device preferably includes a compressed fluid source that is associable with the connection portion of the inflation nozzle. The compressed fluid source is configured for delivering the fluid, which is preferably air, through the nozzle channel in pressure pulses to facilitate opening valves within the flexible structure. Preferably, the compressed fluid source includes a pulse control valve that is operable for automatically pulsing the fluid that is delivered through the nozzle channel. The fluid is preferably delivered in pressure pulses having a period of at least 0.1 seconds. More preferably, the period is between at least 0.25 seconds and 3 seconds. The pressure pulses of fluid are also preferably delivered at a pressure of less than about 20 psi. In the preferred embodiment, the pulses are regular.

The inflation device can also include a user-manipulable control that is operably associated with the compressed fluid source to deliver the pulsed fluid. In one embodiment, the user-manipulable control is a foot pedal.

A preferred method according to the invention includes delivering a fluid through a channel of an inflation nozzle and expelling the fluid from a channel outlet thereof, moving an inflation aperture of a flexible structure toward the channel outlet to locate and open the inflation aperture, and then placing the opened inflation aperture over the inflation nozzle such that the expelled fluid is directed through a filler conduit, or other part of the flexible structure, to inflate the flexible structure. The fluid is preferably delivered through the inflation nozzle in pressure pulses, and the flexible structure is preferably an air cushion.

The present invention thus provides an inflation device and method that can enable quick and easy inflation of inflatable, flexible structures, such as air cushions.

DETAILED DESCRIPTION OF THE PREFERRED EMBODIMENTS

Figure 1:
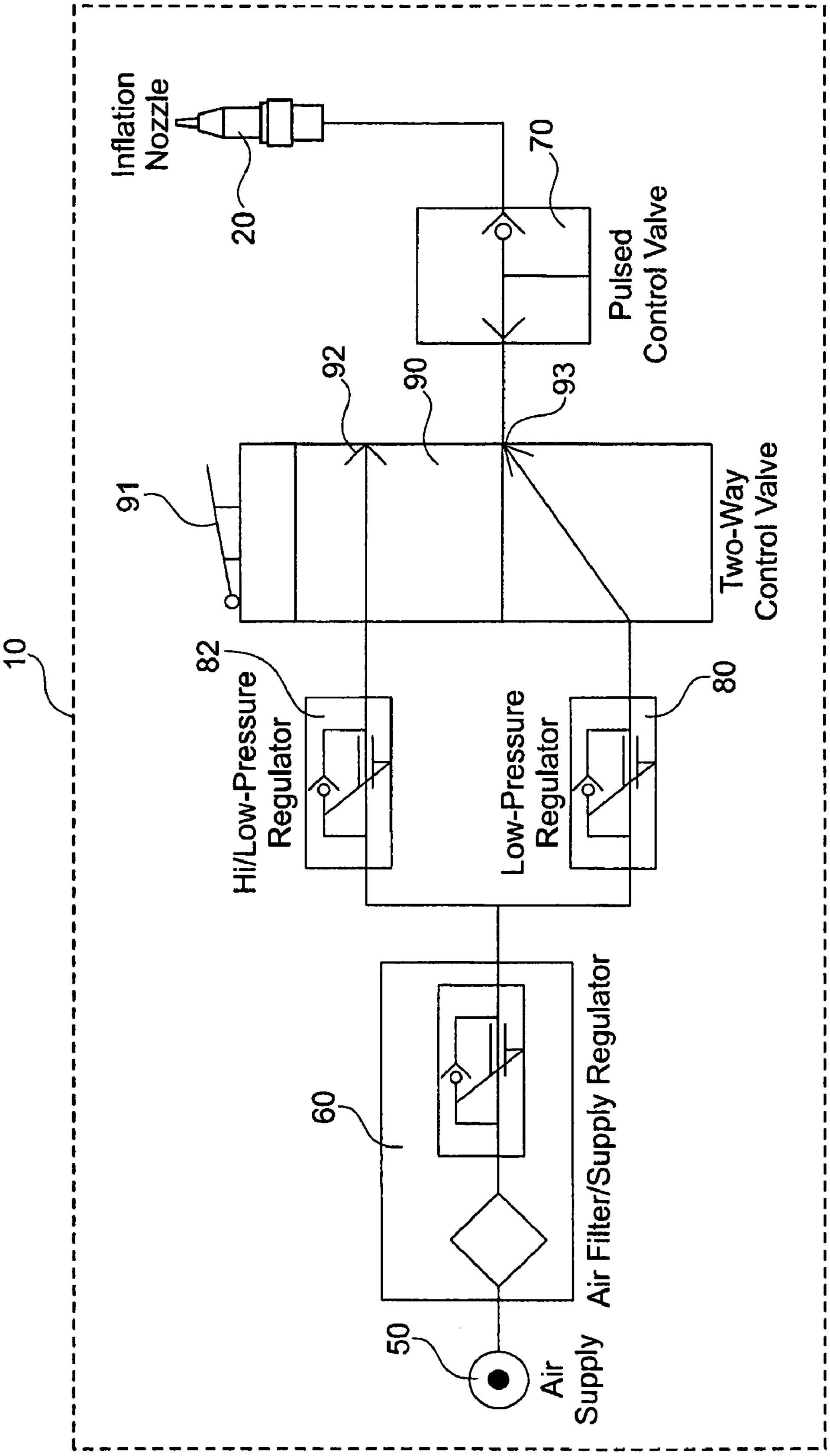
FIG. 1 is a schematic depiction of components of a preferred embodiment of an inflation device constructed according to the present invention.
Figure 2:
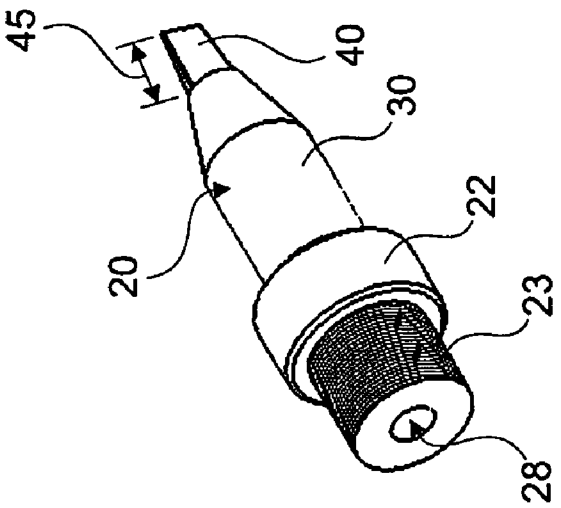
FIG. 2 is a perspective view of a preferred embodiment of an inflation nozzle.

Referring to FIG. 1, a preferred embodiment of an inflation device 10 includes inflation nozzle 20 that is preferably configured for associating with an inflatable, flexible structure, such as an inflatable air cushion. While the inflation device 10 can be used to inflate a variety of inflatable, flexible structures, such as tires or inflatable mattresses, the remaining sections herein are directed to the applicability of the inflation device 10 with respect to inflatable air cushions and inflatable structures formed of a plurality of flexible sheets that are collapsed onto each other.

In a preferred embodiment, the inflation nozzle 20 is configured for insertion within an inflation aperture of the air cushion so that a fluid, preferably air, can be delivered through the inflation nozzle 20 into the cushion. The inflation device 10 also includes a fluid source, such as a pressurized air supply 50, that is preferably kept under pressure by a compressor, and a regulator 60 for regulating the pressure of the air supplied therefrom. The inflation device 10 also includes a pulse control valve 70 for delivering the air through the inflation nozzle 20 in pressure pulses. Other components of the inflation device 10 can include low and high pressure regulators 80, 82, and a control mechanism 90.

Referring to FIGS. 2-5*b*, a preferred embodiment of an inflation nozzle 20 includes a connection portion 22, a nozzle body 30, and a probe, such as locating tongue 40. The nozzle body 30 includes a proximal end 31 and a distal end 32 that define a body length 39 therebetween. The length 39 of the nozzle body 30 is preferably at least about 0.5 inches and at most about 1.5 inches, and more preferably is about 0.75 inches. The nozzle body 30 preferably has an annular cross-section that defines a nozzle channel 34, which runs the length 39 of the nozzle body 30. The nozzle body 30 preferably has an exterior engagement surface 33, which has an outer diameter that is sized to fit within, and completely or partially seal, the inflation aperture 16 of filler conduit 14 of an inflatable cushion 18 for directing fluid therein. Preferably, the outer diameter of the nozzle body 20 at its widest point is at least about 1/10 inch and at most about ½ inch, more preferably is at least about ¼ inch and at most about ⅓ inch, and in a preferred embodiment, is about 0.325 inches. In other embodiments, the length and diameter of the nozzle body can vary depending on the size of the aperture of the filler conduit of the inflatable cushion that is to be inflated, and can be larger or smaller.

The nozzle channel 34 is configured to direct fluid through the inflation nozzle 10, and receive and position the locating tongue 40 therethrough. The nozzle channel 34 is preferably substantially tubular, but can be configured to closely match the configuration of the locating tongue 40. Preferably, the nozzle channel 34 includes a recessed slot 35 near the proximal end 31 of the nozzle body 30, and the recessed slot 35 is configured to seat a based 43 of the locating tongue 40 to prevent longitudinal and rotational movement of the locating tongue 40 relative to the nozzle body 30. The nozzle channel 34 also includes a channel outlet 37 at the distal end 32 of the nozzle body 30, which is preferably configured for expelling fluid therefrom. The channel outlet 37 preferably directs the expelled fluid from the nozzle 20 along a longitudinal axis 46 that is parallel to the nozzle channel 34.

A portion of the nozzle body 30 preferably tapers toward the distal end 32. As shown in the embodiment of FIGS. 2-5*b*, the tapered portion 36 is located at the distal end 32 of the nozzle body 30. In other embodiments, the nozzle body can be untapered, tapered along substantially its entire length B, or have multiple tapered portions. The tapered configuration of the nozzle body 30 advantageously facilitates insertion of the inflation nozzle 20 in the aperture 16 of the inflatable cushion 18. The tapered portion 36 preferably extends at least about ¼ inch and at most about ½ inch. Preferably, the tapered portion 36 of the nozzle body 30 does not extend past the check-valve 13 of the first tubular portion 19 when the nozzle body 30 is inserted within the aperture 16 of the filler conduit 14, and in the preferred embodiment, the tapered portion 36 ends at least about ¼ and at most about ⅛ inches from the first check-valve 13 of the cushion 18.

The probe, locating tongue, or air director 40 includes a proximal end 41 and a distal end 42 that define a tongue length 44 therebetween. Preferably, the entire length 44 of the locating tongue 40, or only its distal end 42, is substantially flat. The locating tongue 40 protrudes from within the nozzle channel 34 of the nozzle body 30 along the longitudinal axis 46 of the air flow. The locating tongue 40 is preferably made of metal or plastic, and in the preferred embodiment, the locating tongue 40 is made of brass. The locating tongue 40 can be substantially flat on only one side thereof parallel to the flow of the air through the channel 34, it can be flat on opposite sides parallel to the air flow, or it can have other cross-sections including substantially circular. The locating tongue 40 can alternatively be mounted on the exterior of the nozzle body 30, but preferably is aligned with the channel outlet 37.

The length 44 of the locating tongue 40 is preferably longer than the length 39 of the nozzle body 30, such that the distal end 42 of the locating tongue 40 protrudes from and beyond the channel outlet 37 of the nozzle body 30 when the locating tongue is disposed in the nozzle channel 34. Preferably, the distal end 42 of the locating tongue 40 extends less than about 0.5 inches from the channel outlet 37 of the nozzle body 30, and more preferably, the distal end 42 extends by at least about 0.05 inches and at most about 0.25 inches from the channel outlet 37. The tongue 40 preferably protrudes from the channel outlet 37 to the distal end 42 by at distance 45 of at least about ¼ times the diameter of the channel outlet 37, more preferably at least about ½ times the diameter, and most preferably at least 1 or 1.5 times the diameter, and up to about 3 times the diameter, and more preferably up to about 2 times the diameter. The embodiment shown has a tongue 40 that protrudes by a distance 45 of about 1.25 times the outlet 37 diameter.

In the preferred embodiment, the air cushion 18 is a multi-ply film package made of film sheets or walls 17 that are sealed together in predetermined areas 21 to define a filler conduit 14, which is preferably flexible and normally in a collapsed state, and inflatable tubular portions 19. The width of each tubular portion 19 is preferably at least about 0.5 inches and at most about 1.0 inch. The walls 17 are preferably made of polyolefin, or other barrier-type or co-extruded materials. In one embodiment, for example, the walls 17 can be made of a multi-layered structure that includes a layer of low-density polyethylene, a layer of nylon, and a layer of low-density polyethylene. The layers of the multi-layered structure are adhered or otherwise attached together, for example, by tie layers made by Pliant Corporation. The walls 17 preferably have a thickness of at least about 0.5 mil and at most about 10 mil, and more preferably have a thickness of at least about 0.75 mil and at most about 5 mil.

The cushion 18 also includes a filling opening or aperture 16 at one end of the filler conduit 14. The aperture 16 is defined by the walls 17 and is configured and dimensioned for receiving the inflation nozzle 20 therein. Preferably, the inflation nozzle 20 is sized to have a friction fit with the aperture 16 at least about exterior engagement surface 33, and more preferably also about the tapered portion 36, of the inflation body 30. In one embodiment, the inflation nozzle 20 has an interference fit with the aperture 16. Located partially within the aperture 16 and filler conduit 14, and extending partially into each of the tubular portions 19, is another set of sheets 12, which are also sealed at areas 21, except at valve areas 15 to define one-way check-valves 13 between the areas 15, configured to let air into the tubular portions 19 and seal it therein. The unsealed areas between sheets 12 that define the check-valves 13 are preferably kept unsealed during the sealing operation that seals inner sheets 12 to outer sheets 17 by printing on the areas to remain unsealed.

Each of the one-way check-valves 13 fluidly connect the filler conduit 14 to a respective tubular portion 19. In the uninflated state, for example during shipping of the cushions 18, the aperture 16 is closed and flat, and the check-valves 13 are in a closed position. Upon opening of the aperture 16 by the inflation nozzle 20, air can be delivered into the filler conduit 14. Preferably, the operating pressure at which the air is delivered into the filler conduit 14 opens the check-valves 13 to allow air to pass into the tubular portions 19 to inflate the remaining portions of the cushion 18. Once inflation of the cushion 18 is complete, the pressure of the air within each tubular portion 19 acts against the check-valves 13 to keep the valves in the closed position, thus preventing air from escaping and the cushion from deflating.

Figure 3A:
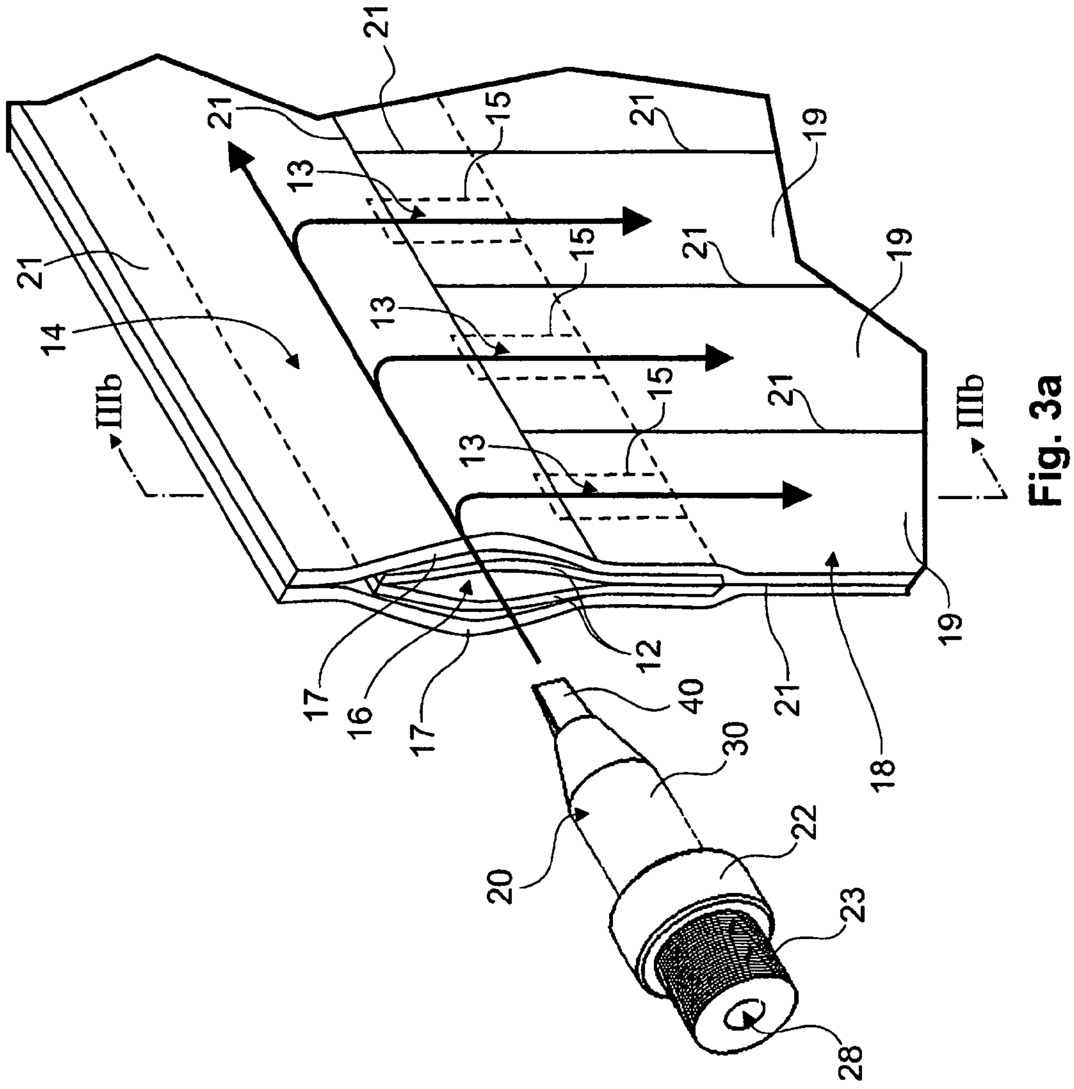
FIG. 3*a* is a perspective view of an inflation nozzle directing air to locate and open an aperture of an air cushion of the preferred embodiment.
Figure 3B:
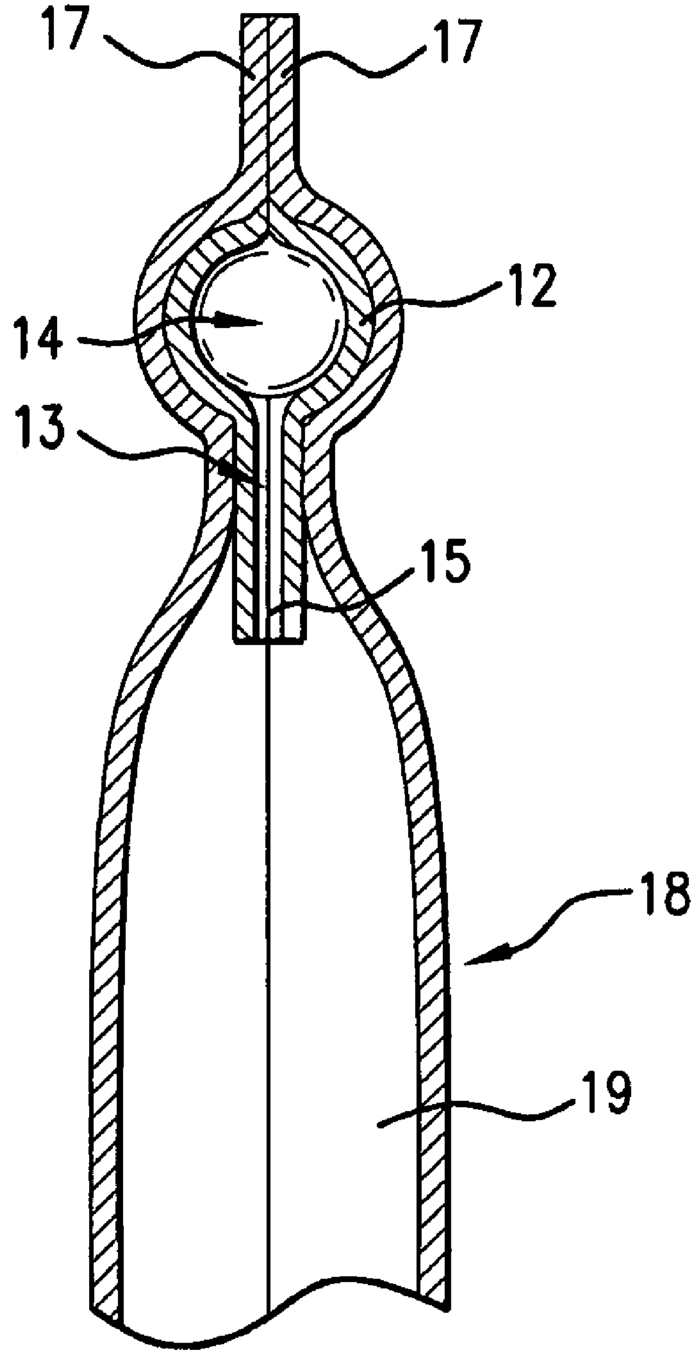
FIG. 3*b* is a cross-sectional view of the air cushion of FIG. 3*a* along the axis IIIb.
Figure 4:
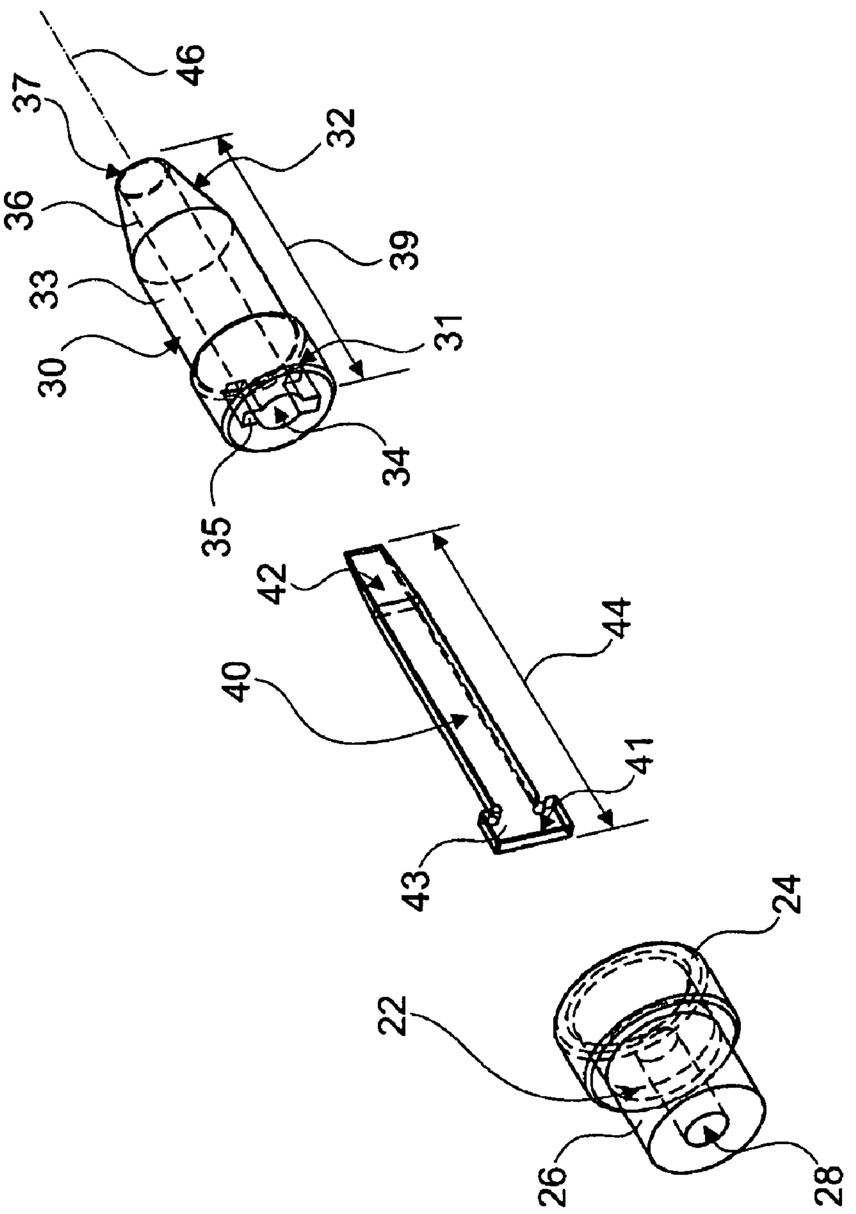
FIG. 4 is an exploded view of the inflation nozzle of FIG. 2.
Figure 5A:
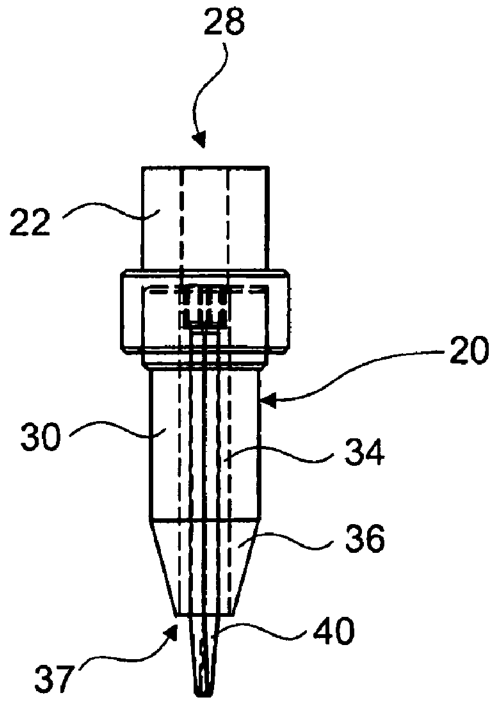
FIGS. 5*a* and 5*b* are side and top views, respectively, of the inflation nozzle of FIG. 2.
Figure 5B:
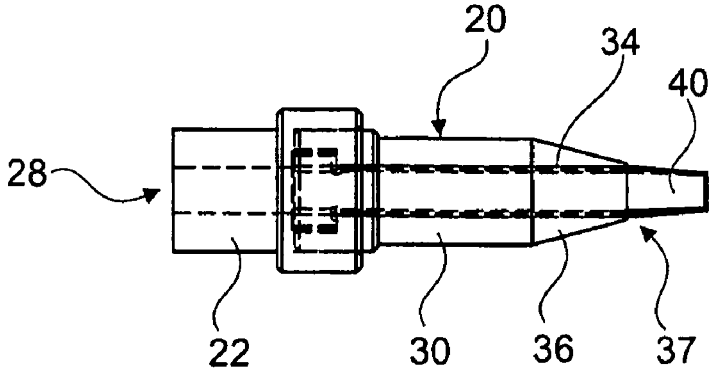

The distal end 42 of the locating tongue 40 is preferably tapered to provide a distal wedged-end. The locating tongue 40 advantageously is usable to mechanically wedge apart the sheets 17 that form the aperture 16 to better locate and open the aperture 16, which can be difficult to do with the user's fingers or with a traditional inflation nozzle due to the inherent stickiness or tackiness of the plastic sheets. Also, the locating tongue 40 can be used to aerodynamically open the walls 17 of the aperture 16 before the distal end 42 of the tongue comes in contact therewith. It has been found that the locating tongue 40 can split the airflow around the tongue 40, creating a vortex of air that works to separate the walls 17 and open the aperture 16 prior to inserting the nozzle 20 or tongue 40 physically into the aperture 16. For example, as the aperture 16 of the inflatable cushion 18 is brought in close proximity, within approximately 1 inch, of the locating tongue 40, as shown in FIG. 3*a*, the supply air that is delivered, preferably in pulsed increments, from the channel outlet 37 is split as it passes over the tongue 40 and causes the aperture 16 to open. This eliminates or significantly reduces the need to manually locate the aperture 16 or to work the walls 17 apart to position the aperture 16 over the nozzle 20. Once the walls 17 of the aperture 16 are separated, the flat, wedged profile of the distal end 42 easily fits therebetween, and the aperture 16 can be fitted over the exterior surface 33 of the nozzle body 30 while the delivered air proceeds to open the remaining check-valves 13 and inflate the tubular chambers 19 of the cushion 18.

Figure 6:
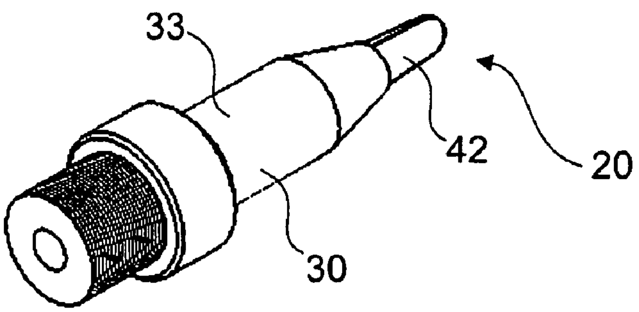
FIG. 6 is a perspective view of an embodiment of an inflation nozzle with a rounded locating tongue.
Figure 7:
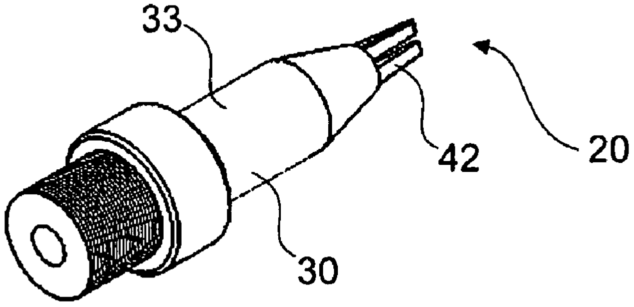
FIG. 7 is a perspective view of an embodiment of an inflation nozzle with a forked locating tongue.
Figure 8:
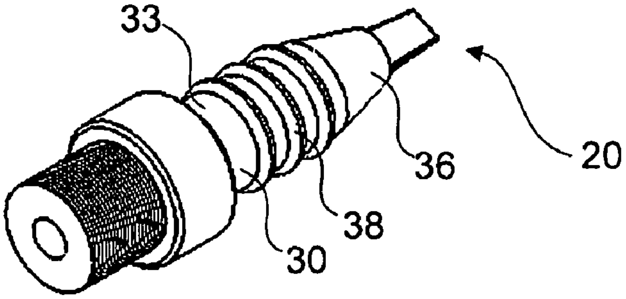
FIG. 8 is a perspective view of an embodiment of an inflation nozzle with a ribbed nozzle body.

In other embodiments, the locating tongue of the inflation nozzle 20 can have different configurations, for example, with a round tip as shown in FIG. 6, or with a forked tip as shown in FIG. 7. Referring to the embodiment of FIG. 8, the nozzle body 30 can also include protrusions, such as ribs 38, that protrude radially along the exterior engagement surface 33 to help retain the aperture 16 of the inflatable cushion 18 in association with the inflation nozzle 20 once the nozzle body 30 is inserted therein. As the cushion 18 is inflated, the nozzle 20 creates resistance to maintain association within the aperture 16 during inflation, preferably due to the ribs 38 and the angular forces imparted on the aperture 16. The ribs 38 are also configured for improving the seal of the air cushion 18 about nozzle body 30 to retain the air within the air cushion 18. The ribs 38 can be distributed along the entire length 39 of the nozzle body 30, or can be located along only a portion thereof. The size of the protrusions can be varied along the longitudinal length 39 of the nozzle body 30, such as to gradually increase in radius from the distal end 32 to the proximal end 31 to provide varying gripping and sealing properties.

The connection portion 22 is preferably removeably associated with the nozzle body 30, preferably at the proximal end 31 thereof. Such a configuration allows the connection portion 22 and nozzle body 30 to be separated for replacement of the locating tongue 40, which may be changed depending on the type and size of the inflatable cushion 18 that is to be inflated. Preferably, the connection portion 22 and the nozzle body 30 are in a snap-fit or threaded association. The association between the connection portion 22 and the nozzle body 30 is also preferably air-tight to prevent supply air from leaking therebetween.

The nozzle body 30 is preferably attached to a flared portion 24 of the connection portion 22. The diameter of the flared portion 24 is preferably larger than the outer diameter of the nozzle body 30, and preferably also larger than the diameter of the aperture 16 of the cushion 18 that is to be inflated. The flared portion 24 having such a configuration advantageously limits the distance that the inflation nozzle 20 can be inserted in the aperture 16, and thus prevents over-insertion of the nozzle therein.

The connection portion 22 also preferably includes a threaded end 26 that is configured for fluidly associating with an air hose. Preferably, the threaded end portion 26 includes threaded portions 23 or other securing mechanisms to maintain the connection portion 22 in air-tight, fluid association with the air hose. In the preferred embodiment, the threads 23 are ⅛ inch NPT threads. The connection portion 22 also defines a portion 28 of the nozzle channel 34. The channel portion 28 directs supply air from the air hose to the nozzle channel 34 of the nozzle body 30, and thus around the locating tongue 40 disposed in the channel 34.

As shown in FIG. 1, the compressed fluid source or air supply 50 of the inflation device 10 is preferably kept under pressure, such as in 10 to 100 gallon air tanks at about 100 psi, or other suitable volume and pressure. The tank can be fed by a compressor. The inflation device 10 also preferably includes an air filter and supply regulator 60 to regulate the pressure of the compressed supply air to relatively lower operating pressures for use in inflating the inflatable cushions 18. Preferably, the inflation device 10 fills the inflatable cushions 18 at an operating pressure of less than about 20 psi, and more preferably at an operating pressure of less than about 15 psi. In a preferred embodiment, the cushions 18 are filled at an operating pressure of at least about 5 psi and at most about 14 psi. In addition, other regulators, such as precision, low or high pressure regulators can be used in series with the regulator 60, the low pressure regulators 80, 82 preferably being in parallel with each other as shown in FIG. 1. These additional regulators provide further adjustment features, for example, by enabling a user to select from which low pressure regulator to connect the pulse control valve 70, or for connecting other pneumatic components to the free output 92 or 93.

The inflation device 10 also includes a control mechanism, for example, two-way control valve 90. The control valve 90 allows the user to activate the inflation device 10. Preferably, the control valve 90 is foot-pedal 91 that is configured to select on and off positions, but in some embodiments, the control valve 90 is adjustable to help regulate the pressure of the air delivered to the inflation nozzle 20. For example, the control valve 90 can have high and low settings. The control valve 90 can also be used to switch between the high or low pressure regulators 80, 82, which can be preset to regulate the supply air at different operating pressures. Also, other types of user-manipulated controls can be used. Foot-pedal 91 allows the inflation device 10 to be controlled while leaving the user's hands free to handle the inflatable cushions 18.

The pulse control valve 70 is preferably configured to automatically deliver the supply air, which is regulated to the desired operating pressure, to the inflation nozzle 20 in pressure pulses. Advantageously, delivering the air supply in pulses rather than at a constant rate can aid in aerodynamically initially locating and opening the aperture 16 of the inflatable cushion 18. For example, as the aperture 16 is brought near the distal end 42 of the locating tongue 40, the pulsed air supply emitted from the channel outlet 37 and directed by the tongue 40 acts to gradually and incrementally separate the plastic walls 17 of the aperture 16 to locate and open the aperture 16. This technique of delivering the supply air in pulses works much better and more efficiently to initially unstick the length of the filler conduit 14 and check-valves 13 than simply providing the supply air at a constant inflation rate.

The pulsed delivery of supply air also helps to achieve an even and proper inflation of the entire cushion. For example, once the aperture 16 is open, the pulsed delivery of supply air also achieves better and more efficient unsticking and opening of the check-valves 13, which typically are naturally sticky after manufacture, than is possible using a traditional constant-pressure air-supply. Thus, a lower pressure of pulsed air can be used than of constant-pressure air. Since once each check-valve 13 opens, its associated tubular portion 19 will inflate to close to the air pressure that is supplied, pulsing the air permits the tubular portions 19 to be filled to a lower pressure than using constant-pressure air. The lower inflation pressures allow softer tubular portions 19 to be provided, thus providing increased cushioning, and less risk that the cushion 18 is too hard or that tubular portions 19 will burst upon impact. Preferably, the air is supplied from the nozzle with a pressure of the pulses at or below about 15 psi, and more preferably below about 10 psi, and the tubular portions 19 are inflated to between about 50% and 75% of their maximum capacity to maximize their protective properties.

Preferably, pulse control valve 70 is preset to automatically deliver a pulsed air supply. In the preferred embodiment, the pulses have a regular period of at least about 0.1 seconds. Selection of the proper pulse period for a particular inflatable cushion is dependent on user specification. In general, selecting a shorter pulse period results in better and more efficient opening of the aperture of the inflatable cushion, as well as each internal check-valve of the tubular portions, and thus a more even inflation of the entire cushion. Selecting a longer pulse period, on the other hand, results in a shorter inflation time once the valves of the inflation cushion are open. In the preferred embodiment, the pulse control valve 70 is set to deliver a pulsed air supply having a period of at least about 0.25 and at most about 3.0 seconds. The pulses of air can include turning the flow on and off, or can include varying the flow between high and low pressures. In the preferred embodiment, a pulse period includes an even amount of time for high and low pressure, or on and off flow. Other embodiments can have other fractions of high and low, or on and off flow.

Figure 9:
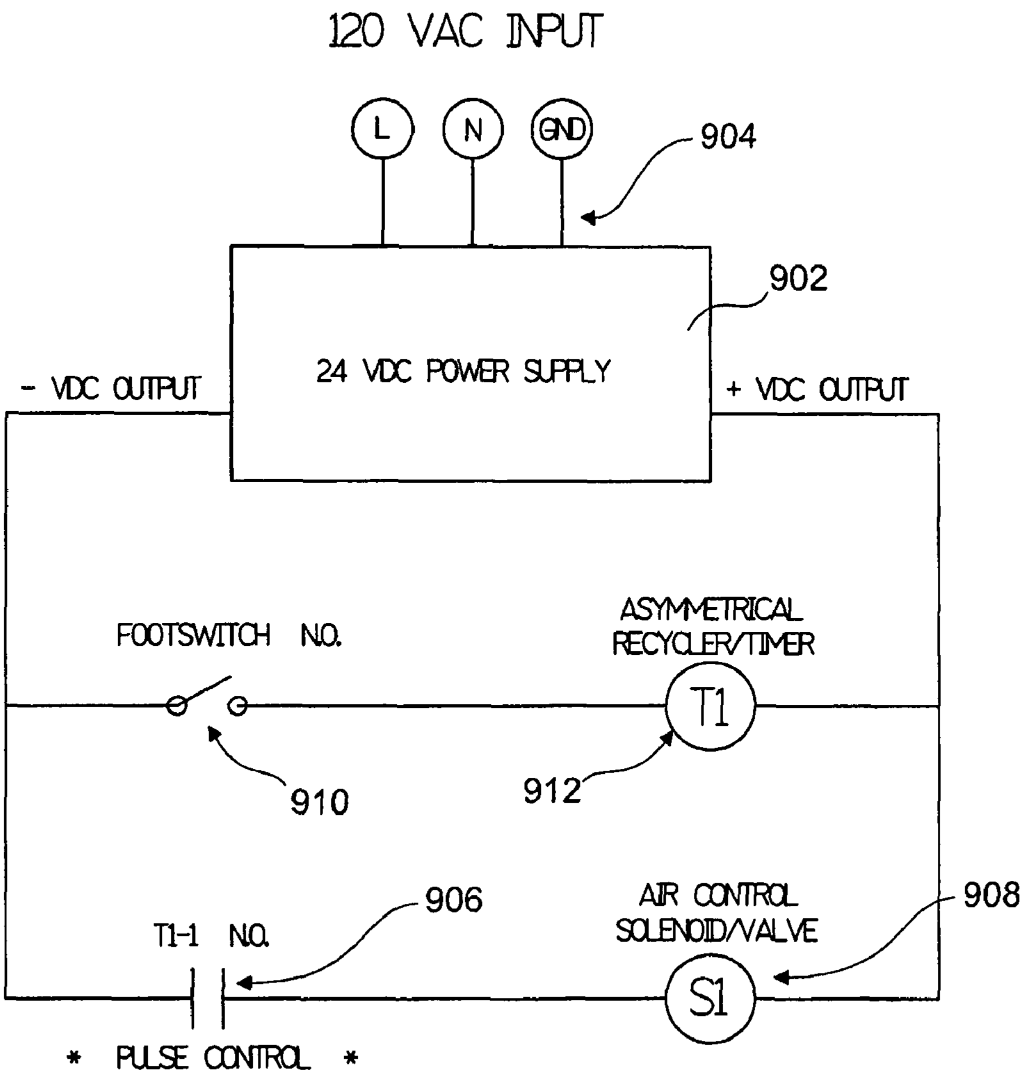
FIG. 9 is a schematic depiction of the electrical system of a pulse control system of the preferred embodiment.

The pulse control valve 70 is preferably operated by an electric or pneumatic system. For example, FIG. 9 depicts a preferred electric operating schematic of the pulsing system. The system preferably includes a 24 VDC power supply 902 having 120 VAC inputs 904. Additionally, an air control solenoid or valve 908 and the control of the pulse control valve 906 are preferably in parallel with the footswitch 910 (i.e. control valve 90) and an asymmetrical recycler or timer 912. Other embodiments can include different pulsing systems, including different electric and pneumatic schematics and components thereof.

Figure 10:
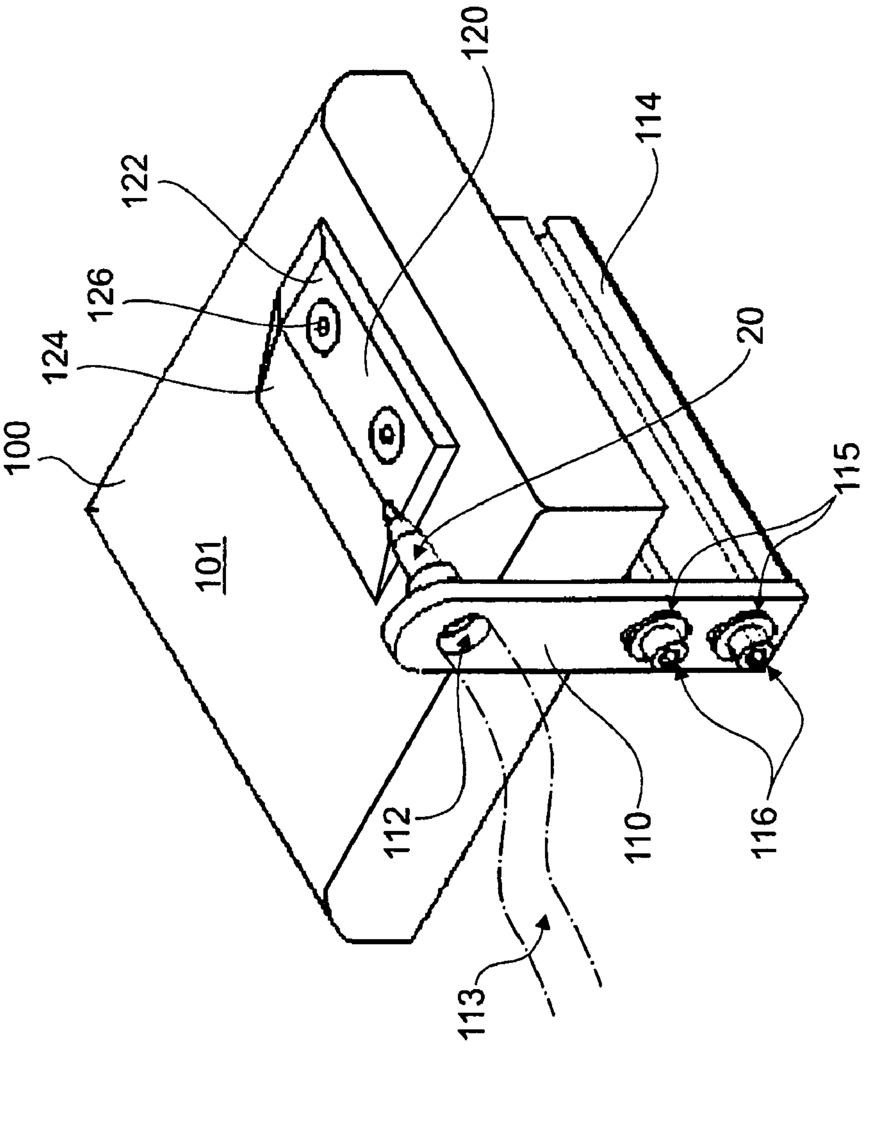
FIG. 10 is a perspective view of a preferred embodiment of the inflation device mounted to a table.
Figure 11:
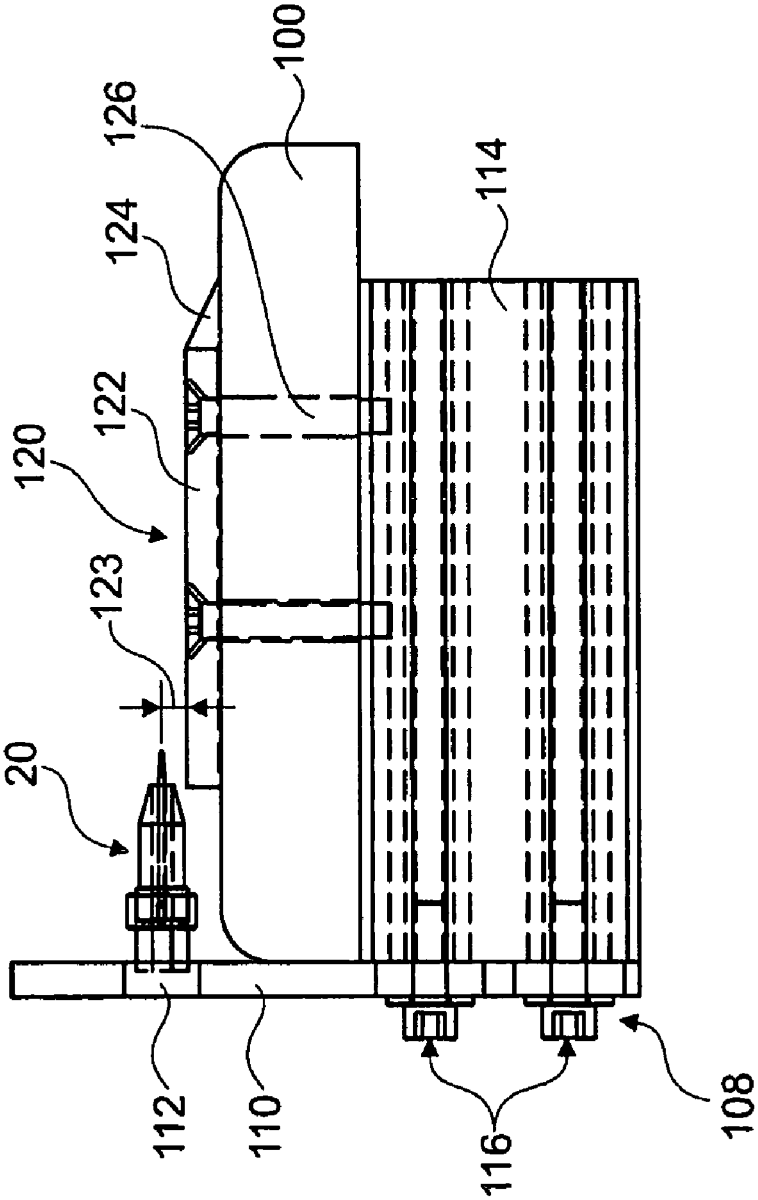
FIG. 11 is a side view thereof.

To make operation easier and more ergonomically efficient for a user, the inflation device 10 is preferably mounted to a working bench or tabletop. For example, as shown in FIGS. 10 and 11, the inflation nozzle 20 is preferably mounted to a bracket 108 at mounting hole 112 such that the nozzle 20 is positioned over a working surface, for example table 100. The mounting hole 112 is preferably configured so that the inflation nozzle 20 can be mounted on one side of the hole 112, and the air hose 113 that leads to the rest of the inflation device can be mounted to the connection portion of the nozzle 20 through the hole. Preferably, the nozzle 20 is in threaded association with the mounting hole 112 of the bracket 108. The remaining components of the inflation device are preferably secured underneath the table 100 or in another convenient location, and in a preferred embodiment, the operation control valve 90 of the inflation device 10 is lever-operated foot pedal 91 to enable activation by the user's feet.

The bracket 108 preferably includes a nozzle mounting portion 110 that can be adjustably or fixedly connected to a table mount portion 114, which is configured for securing to the bottom of the table 100, such as by fasteners. Fasteners 116 are preferably positioned through slots 115, which allow selection of the height of the nozzle mount portion 110 above the surface 101 of table 100. The bracket 108 is preferably mounted near an edge of the table 100 such that the nozzle mount portion 110 extends above the top surface 101 of the table 100, and the inflation nozzle 20 is positioned thereabove.

A positioning member 120, which in the embodiment shown in the figure as a ramp 120, is secured to the surface 101 of the table 100, and preferably has substantially flat upper and lower surfaces to render a low profile against the surface 101. Alternatively, the ramp can have a sloped or curved profile. The ramp 120 is preferably mounted on the surface 101 of the table 100 by securing members 126, which penetrate through the surface 101 to the table mount portion 114. In other embodiments, the ramp can be secured through the table only, or secured to the table mount portion only, such as by a C-clamp.

The ramp 120 preferably includes a flat staging portion 122 and a sloped portion 124. The staging portion 122 preferably has a height configured to position the aperture 16 of the air cushion 18 with respect to the nozzle body 30. Furthermore, the ramp 120 is preferably positioned and aligned on the surface 101 of the table 100 adjacent to or slightly in front of the distal end of the inflation nozzle 20, and at a distance 123 between about 0.1 inches and about 1.0 inches below the longitudinal axis 46 of the nozzle channel outlet 37. The ramp 120 is preferably positioned below the axis 46 at a distance 123 that is selected depending on the size of the cushion 18, and the aperture 16 thereof, such that air expelled from the inflation nozzle 20 is substantially aligned with the aperture 16 to initiate opening of the aperture 16. Preferably, the ramp 120 is positioned to align the axis 46 at about the midpoint of the length of the aperture 16. In the preferred embodiment, the ramp 120 is positioned at a distance 123 at least about ⅛ inch and at most about ¼ inch below the axis 46. In this position, the user can grab the inflatable cushion 18 and easily slide it on the table 100 over the sloped portion 124 and onto the staging area 122. Using his or her foot to operate the inflation device 10, the user can move the aperture portion 16 of the cushion 18 proximate to the locating tongue 40 of the inflation nozzle 20, while the tongue 40 and/or pulsating delivery of supply air locates and opens the aperture 16. The conduit filler 14 is then positioned over the inflation nozzle 20, and maintained thereover by hand or by securing protrusions associated with the nozzle 20, until filling of the inflatable cushion 18 is complete.

In other embodiments, the ramp can be positioned below the axis 46 of the inflation nozzle such that a portion of the nozzle body 30 is below the ramp, and even up to 50% of the tapered portion 36 can be below the ramp. Additionally, the bracket and table mount portion can be used without the ramp. In still other embodiments, the inflation device can include a probe, but no pulsing air supply, or a pulsing air supply, but no probe.

The term "about," as used herein, should generally be understood to refer to both the corresponding number and a range of numbers. Moreover, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. Therefore, it will be understood that the appended claims are intended to cover all such modifications and embodiments that come within the spirit and scope of the present invention.

What is claimed is:

1. An inflation nozzle for inflating a flexible structure, comprising:

a nozzle body defining a nozzle channel therethrough, the nozzle channel having a channel outlet configured and oriented to expel a fluid therefrom substantially coaxially with the nozzle body;

a probe extending from the nozzle body, substantially coaxially with the nozzle channel, adjacent and beyond the channel outlet, the probe configured and dimensioned to facilitate positioning an inflation aperture defined by a flexible wall of the flexible structure onto the nozzle body for directing fluid into the inflation aperture, wherein the channel outlet is continuously open adjacent the probe to allow the fluid to flow through the nozzle channel and out the channel outlet; and a connection portion associated with the nozzle body for fluidly connecting the nozzle channel to a fluid source for delivering fluid through the nozzle channel to inflate the flexible structure.

2. The inflation nozzle of claim 1, wherein the probe comprises a tongue that is substantially flat on at least one side parallel to a flow of the expelled fluid.

3. The inflation nozzle of claim 2, wherein the tongue is substantially flat on opposite sides parallel to the flow of the expelled fluid.

4. The inflation nozzle of claim 1, wherein the probe is mounted within the nozzle channel and protrudes therefrom.

5. The inflation nozzle of claim 1, wherein the probe extends beyond the channel outlet by between about 0.05 and 0.25 inches.

6. The inflation nozzle of claim 1, wherein the nozzle body has an exterior engagement surface configured for reception within and contact with the flexible structure for directing fluid therein, the engagement surface having a diameter of between about 0.25 and 0.35 inches.

7. The inflation nozzle of claim 1, wherein the nozzle body comprises ribs protruding radially therefrom and configured for improving sealing of the flexible structure about the nozzle body to retain the fluid within the flexible structure.

8. An inflation device for inflating a flexible structure, comprising:

the inflation nozzle of claim 1; and a pulsed-fluid source associable with the connection portion and configured to deliver the fluid through the nozzle channel and out the channel outlet in pressure pulses substantially parallel to a longitudinal axis of the nozzle body so as to facilitate opening valves within the flexible structure.

9. The inflation nozzle of claim 1, wherein a distal end portion of the probe is tapered.

10. The inflation nozzle of claim 1, wherein the fluid source is configured to deliver the fluid through the nozzle channel in pressure pulses to facilitate opening the inflation aperture of the flexible structure.

11. The inflation nozzle of claim 1, wherein the channel outlet for expelling the fluid is provided at a tip of the nozzle body.

12. An inflation device for inflating a flexible structure, comprising:

a nozzle body defining a nozzle channel therethrough, the channel having a channel outlet aligned longitudinally with the nozzle body and disposed at a distal tip of the nozzle body, the channel outlet for expelling a fluid therefrom and into an inflation aperture of the flexible structure; and a pulsed-fluid source associated with the nozzle body and configured for automatically delivering the fluid through the nozzle channel in pressure pulses, and the nozzle body being configured to expel the delivered pulsed fluid in a flow that is capable of fluid-dynamically pulsing open an aperture defined by a flexible wall of the flexible structure sufficiently to insert the nozzle;

wherein the channel outlet is oriented with respect to the nozzle body to enable the nozzle body to be moved into the pulsed-open aperture.

13. An inflation device, comprising:

the inflation device of claim 12; and a positioning member having a positioning surface disposed a predetermined position and orientation with respect to the nozzle in alignment with respect to the nozzle channel such that the flexible structure placed thereon is in alignment with respect to the nozzle channel to cause the pulsed fluid expelled from the nozzle to pulse open the aperture to facilitate associating the flexible structure and nozzle body for inflation when the flexible structure is moved along the positioning surface towards the nozzle.

14. The inflation device of claim 13, further comprising a bracket to which the inflation nozzle is mounted, the bracket being configured for attachment to a table to fix the inflation body in a predetermined position above the table, wherein the positioning member comprises a ramp positionable on the table and configured for allowing the flexible structure to be slid thereover towards the nozzle for pulsing open the aperture and inserting the nozzle body therein.

15. The inflation device of claim 12, wherein the pulsed-fluid source includes a pulse control valve operable for automatically pulsing the fluid that is delivered through the nozzle channel.

16. The inflation device of claim 12, wherein the pulsed-fluid source is configured for delivering the fluid in pressure pulses having a period of at least 0.1 seconds.

17. The inflation device of claim 16, wherein period is between at least 0.25 seconds and 3 seconds.

18. The inflation device of claim 16, wherein the pressure pulses of fluid are delivered at a pressure of less than about 20 psi.

19. The inflation device of claim 12, further comprising a user-manipulable control operably associated with the pulsed-fluid source to deliver the pulsed fluid.

20. The inflation device of claim 19, wherein the user-manipulable control is a foot pedal.

21. The inflation device of claim 19, wherein the fluid is air; and the nozzle channel and the pulsed-fluid source are configured to pulse the aperture open aerodynamically.

22. The inflation device of claim 12, wherein the pulses are regular.

23. The inflation device of claim 12, wherein the flexible structure is an air cushion.

24. The inflation device of claim 12, wherein the channel outlet is oriented to expel the fluid substantially coaxially with respect to the nozzle body.

25. The inflation device of claim 12, wherein the pulsed-fluid source and inflation nozzle are to provide an operating pressure in the nozzle channel of less than about 20 psi.

26. The inflation device of claim 12, wherein the operating pressure is at least about 5 psi and at most about 14 psi.

27. The inflation device of claim 12, further comprising a probe extending substantially coaxially from the nozzle body adjacent and beyond the channel outlet.

28. The inflation device of claim 27, wherein the probe comprises a tongue that is substantially flat on at least one side parallel to a flow of the expelled fluid.

29. The inflation device of claim 12, wherein the channel outlet is continuously open adjacent a probe to allow the fluid to flow through the nozzle channel and out the channel outlet.

* * * * *